United States Patent
Herger et al.

(10) Patent No.: US 9,471,708 B2
(45) Date of Patent: *Oct. 18, 2016

(54) COLOCATION AND ANTICOLOCATION IN COLOCATION DATA CENTERS VIA ELASTIC NETS

(71) Applicant: International Business Machines Corporation, Armonk, NY (US)

(72) Inventors: Lorraine M. Herger, Port Chester, NY (US); Neal M. Keller, Pleasantville, NY (US); James R. Kozloski, New Fairfield, CT (US); Matthew A. McCarthy, Holly Springs, NC (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,746

(22) Filed: Mar. 11, 2016

(65) Prior Publication Data

US 2016/0179983 A1     Jun. 23, 2016

Related U.S. Application Data

(63) Continuation of application No. 14/607,603, filed on Jan. 28, 2015.

(60) Provisional application No. 61/987,537, filed on May 2, 2014.

(51) Int. Cl.
*G06F 9/445*     (2006.01)
*G06F 17/30*     (2006.01)
*G06F 9/50*     (2006.01)

(52) U.S. Cl.
CPC ....... *G06F 17/30958* (2013.01); *G06F 9/5061* (2013.01); *G06F 8/60* (2013.01); *G06F 9/445* (2013.01)

(58) Field of Classification Search
None
See application file for complete search history.

(56) References Cited

U.S. PATENT DOCUMENTS

| | | | |
|---|---|---|---|
| 7,278,273 B1* | 10/2007 | Whitted | H05K 7/1497 361/690 |
| 8,291,378 B2* | 10/2012 | Arnold | G06F 8/61 717/104 |
| 8,918,448 B2 | 12/2014 | Deluca et al. | |
| 9,207,993 B2 | 12/2015 | Jain | |
| 2012/0324112 A1* | 12/2012 | Dow | G06F 9/5077 709/226 |
| 2014/0279838 A1* | 9/2014 | Tsirogiannis | G06F 17/30917 707/603 |
| 2015/0163206 A1* | 6/2015 | McCarthy | G06F 21/6227 713/171 |

OTHER PUBLICATIONS

List of IBM Patents or Patent Applications Treated as Related, (Appendix P), Date Filed Mar. 29, 2016, 2 pages.
Lorraine M. Herger, et al., "Colocation and Anticolocation in Colocation Data Centers Via Elastic Nets," U.S. Appl. No. 14/607,603, filed Jan. 8, 2015.

* cited by examiner

*Primary Examiner* — Isaac Tecklu
(74) *Attorney, Agent, or Firm* — Cantor Colburn LLP; Vazken Alexanian (57) ABSTRACT

An application processing system for placing applications and their associated data into a colocation data center, wherein an application placement module is configured to perform the method of steps including: constructing a facility communication node graph; constructing a composite elastic map which represents the compute nodes in the colocation data center; associating a force function between two nodes based on communication bandwidth; constructing an application usage data space; inserting the node graph into the application data space; assigning the applications to the compute nodes; associating a force function between each application and each compute node based on the assignment; determining an elastic map energy (EME) for the elastic map, wherein the EME is the total energy of the system; and assigning the real-world applications to the real-world compute nodes in the data center if the EME is less than a threshold energy.

1 Claim, 5 Drawing Sheets

COLOCATION AND ANTICOLOCATION IN COLOCATION DATA CENTERS VIA ELASTIC NETS

DOMESTIC PRIORITY

This application is a continuation of U.S. patent application Ser. No. 14/607,603, entitled "COLOCATION AND ANTICOLOCATION IN COLOCATION DATA CENTERS VIA ELASTIC NETS," filed Jan. 28, 2015, which claims priority to U.S. Provisional Application No. 61/987,537, entitled "COLOCATION AND ANTICOLOCATION IN COLOCATION DATA CENTERS VIA ELASTIC NETS," filed May 2, 2014, the disclosure of which is incorporated by reference herein in its entirety.

BACKGROUND

The invention relates to the field of creating a more efficient colocation data center. More specifically, the invention relates to a method, system, and computer program product for placing corporate software applications and their associated data efficiently into computing nodes of a data center.

Organizations are increasingly relying on their computing applications to support customer interactions and to manage inter and intra organizational workflows. As application features, workloads, and infrastructure technology rapidly evolve and change, the management of these applications and their supporting infrastructure becomes a huge challenge for these organizations. Many organizations have dealt with this challenge by outsourcing the hosting of critical applications to data centers.

In addition, the problem of growing data storage needs in enterprise business applications creates a situation where the movement of data is prohibitive. Therefore, optimal hosting of critical applications for an organization need to place these applications and their data, which cannot be moved, optimally into computational facilities.

A colocation data center is a type of data center where organizations can rent equipment space and bandwidth. Colocation facilities provide power, space, cooling, and physical security for the server, storage, and networking equipment of other organizations and connect them to a variety of telecommunications and network providers with minimum cost and complexity. Colocation data centers also offer redundant systems for all these features to mitigate problems when each inevitably fails.

There are many models for collocating applications into data centers. However, it is desired to have more efficient colocation data centers and to give management the ability to run "what if" scenarios concerning the various configurations of components of the data centers.

SUMMARY

Accordingly, one aspect of the present invention is an application processing system for placing applications and their associated data into a colocation data center, the application processing system including: a memory; a processor communicatively coupled to the memory; and an application placement module communicatively coupled to the memory and the processor, wherein the application placement module is configured to perform a method for placing applications and their associated data into a data center, the steps of a method including: constructing a facility communication node graph; constructing a composite elastic map which represents the compute nodes in the colocation data center; associating a force function between two nodes based on communication bandwidth; constructing an application usage data space; inserting the node graph into the application data space; assigning the applications to the compute nodes; associating a force function between each application and each compute node based on the assignment; determining an elastic map energy (EME) for the elastic map, wherein the EME is the total energy of the system; and assigning the real-world applications to the real-world compute nodes in the data center if the EME is less than a threshold energy.

Another aspect of the present invention is an application processing system for placing applications and their associated data into a data center, the application processing system including: a memory; a processor communicatively coupled to the memory; and an application placement module communicatively coupled to the memory and the processor, wherein the application placement module is configured to perform the steps of a method including: constructing a facility communication node graph to construct an elastic map; constructing a client application usage data space; associating a force function between two nodes based on communication bandwidth; inserting the node graph into the data space; assigning the applications to the nodes; associating a force function between each application and each node based on assignment; allowing the nodes to relax towards the applications based on the sum of forces between them creating a relaxed system; determining whether the system is satisfactory; and placing the applications into the data center based on a function of the distances between the applications and the nodes in the relaxed system.

Another aspect of the present invention is a computer implemented method for placing applications and their associated data into a data center, wherein the computer includes a processor communicatively coupled to a memory, the method including: constructing a facility communication node graph to construct an elastic map; constructing a client application usage data space; associating a force function between two nodes based on communication bandwidth; inserting the node graph into the data space; assigning the applications to the nodes; associating a force function between each application and each node based on assignment; allowing the nodes to relax towards the applications based on the sum of forces between them creating a relaxed system; determining whether the system is satisfactory; and placing the applications into the data center based on a function of the distances between the applications and the nodes in the relaxed system.

BRIEF DESCRIPTION OF THE DRAWINGS

FIGS. 2(A), 2(B) and 2(C) are schematic illustrations showing the construction of an elastic map according to an embodiment of the present invention. More specifically as follows:

DETAILED DESCRIPTION

The present invention provides efficient placement of software applications and their associated data into a colocation data center. More specifically, the present invention is a method, system, and computer program product for placing software applications efficiently into a network of nodes that represent computing nodes, or cores, and using elastic maps containing the nodes to determine efficient placement. Additionally, the use of fictitious nodes and fictitious node configurations in an elastic map are described herein. Fictitious nodes can be, but are not limited to, test nodes, hypothetical nodes, or compute nodes that are not currently powered on in the data center facility.

Service providers can colocate or anti-colocate software applications on machines to ensure viable performance in terms of CPU use, network use, critical and noncritical infrastructure use, management of risks and compliance, and/or criticality all in a dynamic fashion. In the present invention, elastic maps are used to help determine how to locate the various applications and their associated data. Through the use of an elastic map, gains in performance, price, and/or security can be achieved. However, we particularly focus on the use of elastic maps to determine levels of efficiency in respect to communication bandwidth. Elastic maps provide a tool for nonlinear dimensionality reduction. By their construction, elastic maps are a system of elastic springs embedded into a data space. The system allows continual simulation of the optimal deployment of computing resources in the colocation data center based on the constraints of bandwidth between computational nodes and the usage statistics of client applications and their data. In addition, fictitious nodes and fictitious node configurations can be introduced into the mapping (also existing nodes can be removed) and the estimated communication cost (thus, performance) of these changes can be automatically and continuously calculated.

In other words, a colocation data center service can "plug-in" to the elastic map a collection of fictitious nodes. These fictitious nodes can represent nodes that are not currently powered-on/actualized (e.g., turned off to reduce costs) in the data center or nodes not yet purchased. The elastic-map energy (EME) of the resultant composite elastic map is measured. If the EME is sufficiently lower in one configuration than another and a decision module (DM) determines the configuration with the lower energy to be sufficiently beneficial, then the compute nodes are automatically powered on and connected. Other "real" nodes (nodes actively in use) can also be removed (e.g., powered off or disconnected). These fictitious node configurations can represent computing cores in racks with different electrical power-use (energy-use) characteristics (e.g., low power and high power) or changes in computing cores that effect bandwidth parameters (e.g., changing switches, cables, or the service level agreement with internet service providers, etc.).

Some preferable embodiments are described below in more detail with reference to the accompanying drawings, in which the preferable embodiments of the present invention have been illustrated. However, the present invention can be implemented in various manners and, thus, cannot be construed to be limited to the embodiments disclosed herein. On the contrary, these embodiments of the present invention are provided for the thorough and complete understanding of the present invention and for completely conveying the scope of the present invention to those skilled in the art. The same reference generally refers to the same components in the exemplary embodiments of the present invention.

As will be appreciated by one skilled in the art, aspects of the present invention can be embodied as a system, method, or computer program product. Accordingly, aspects of the present invention can take the form of an entirely hardware embodiment, an entirely software embodiment (including firmware, resident software, micro-code, etc.), or an embodiment combining software and hardware aspects that can all generally be referred to herein as a "circuit," "module," or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
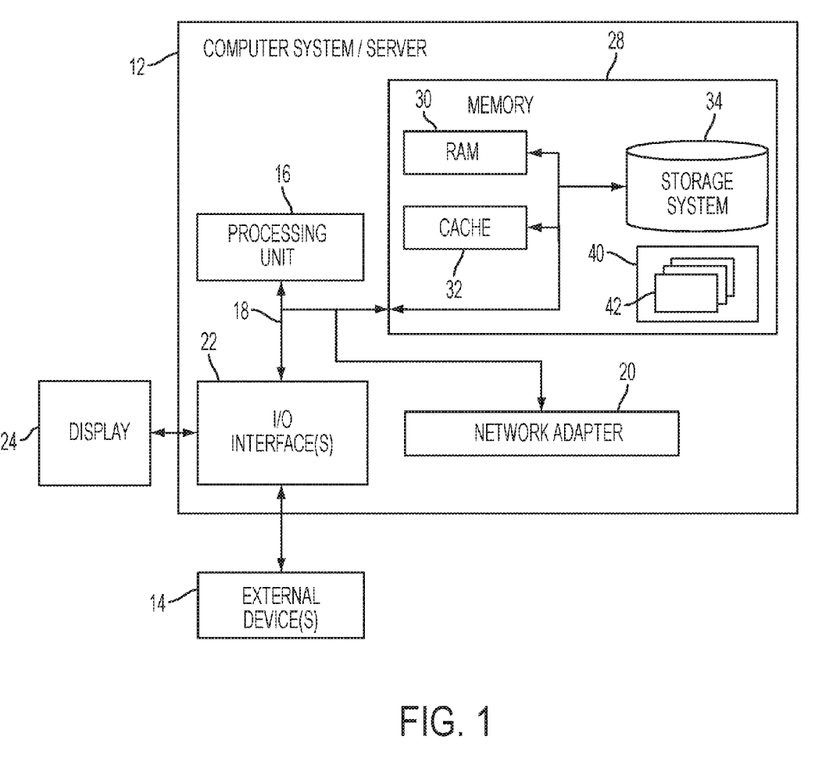
FIG. 1 is a block diagram of an exemplary computer system on which the present invention can be implemented according to an embodiment of the present invention.

Referring to FIG. 1, FIG. 1 shows a block diagram of an exemplary computer system/server 12, which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12 and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 (such as a keyboard, a pointing device, a display 24, etc.), one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to, microcode, device drivers, redundant processing units, external disk drive arrays, RAID systems, tape drives, and data archival storage systems, etc.

In order to better understand the steps of the method necessary for carrying out the objects of the present invention and for better understanding the mode of operation, the essential features of the present invention are first briefly described, followed by a detailed explanation of the steps of the method.

Figure 2A:
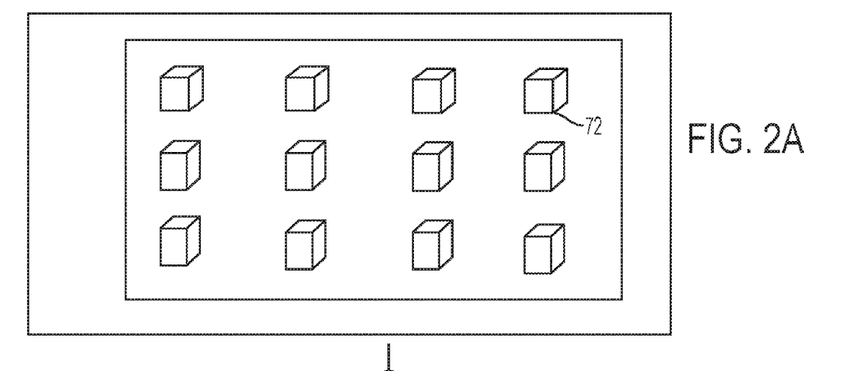
FIG. 2(A) is a map of the colocation data center facility.
Figure 2B:
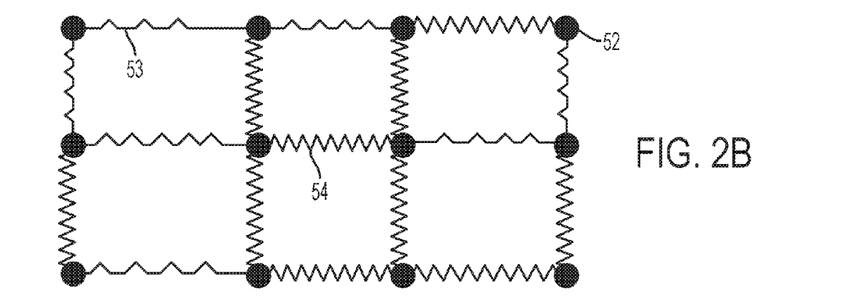
FIG. 2(B) is a facility communication node graph.
Figure 2C:
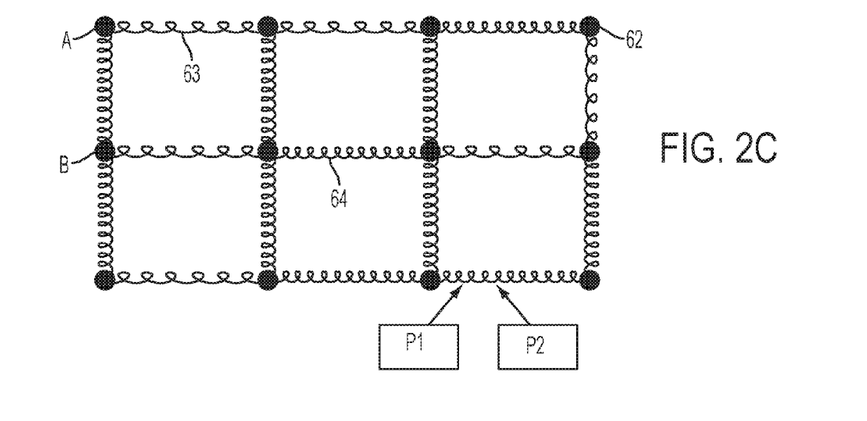
FIG. 2(C) is a representation of the elastic map.

Referring to FIG. 2, FIG. 2 is a schematic illustration showing the construction of an elastic map according to an embodiment of the present invention. FIG. 2(A) is a map of the data center facility. FIG. 2(B) is the facility communication node graph. Each square box in FIG. 2(A) and each solid black dot in FIGS. 2(B)-2(C) represent a compute node (72, 52, and 62, respectively), such as processors and cores. The compute nodes are linked together by a communication path. The communication paths represent communication bandwidth between the compute nodes. Bandwidth 53 represents low bandwidth and bandwidth 54 represents high bandwidth. FIG. 2(C) is a representation of the elastic map. In other words the elastic map is a composite graph of the facility communication node graph. The facility communication node graph is turned into the elastic map by turning the bandwidths into spring constants. The bandwidths and spring constants are proportional to one another. A high bandwidth corresponds to a strong/tight spring and low bandwidth corresponds to a weaker/looser spring. Therefore, bandwidth 53 corresponds to spring 63 and bandwidth 54 corresponds to spring 64. P1 and P2 represent fictitious nodes. A and B are applications that have been assigned to a particular compute node. Note that each application can be shared by more than one compute node according to an embodiment of the present invention.

When using elastic maps in one embodiment of the present invention, the nodes of the elastic map represent compute nodes. Data points represent the applications and their associated application data that make use of such nodes. The virtual springs that join the nodes represent communication paths and bandwidths. Values for bandwidth affect the spring constants. A long stretching of a spring is usually considered undesirable, especially if bandwidth between the compute nodes is high. In this representation, the compute nodes can be considered to move toward the applications to acquire them. In the end, we obtain one optimized distribution of tasks that minimizes communication lengths and bandwidths.

Figure 3:
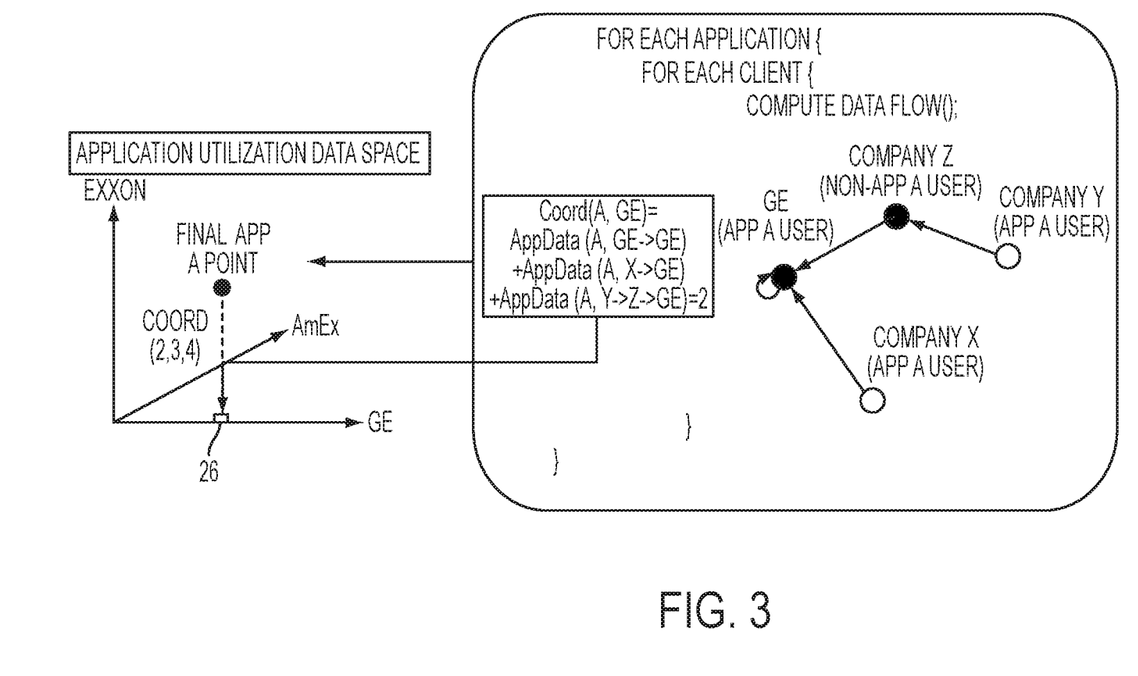
FIG. 3 is an illustration showing computing the data usage for each application for each client for the application utilization data space and an illustration of the application utilization data space according to an embodiment of the present invention.

Different companies (e.g., GE, Exxon, and American Express) can represent different possible "dimensions" of the application usage data space. In other words, the applications live in a Euclidean space, where each dimension of the space represents the utilization of an application by a specific customer. Utilization is through direct use or indirect use (e.g., using data communicated to or from another customer's instance of an application is also considered as use) of the application. To determine the total usage value, a customer/application data communication graph can be created and the sum of all data communicated from or to a customer via an application computed. First, a customer's use of a native application is added to the usage value based also on the amount of data processed by the application. Second, using this graph data communicated from other users of the application is also accrued. Note that certain distant communications can be excluded based on the degree relationship between the customer and the application from which certain communicated data derives. For example, a customer can receive data directly from a certain application run by another entity, so the usage value for this application-customer relationship will be increased. However, data then relayed by this customer to a third party can not contribute to the third party's usage value for the originating application because it is a second order relationship. FIG. 3 is an illustration showing computing the data flow for each application for each client for the application utilization data space and an illustration of the application utilization data space according to an embodiment of the present invention. Note further that two instances of a single application that operate over completely independent data sets can be considered two different application data points mapped into the application data space and can, therefore, be mapped to different nodes using the elastic map.

For example referring to FIG. 3, FIG. 3 is an Application Utilization Data Space. GE, Exxon, and American Express represent the different dimensions of the application usage data space. Application A is located at coordinate (2, 3, 4) or Coord(GE, Amex, Exxon). Coordinate Point 26 represents the application utilization for GE. GE's application utilization coordinate is determined by the total usage value of direct and indirect use of Application A. Therefore, the coordinate for application A in the dimension of GE is Coord(A, GE)=AppData(A, GE->GE)+AppData (A, X->GE)+AppData(A, Y->Z->GE)=2. The application usage data is also calculated for Exxon and American Express. For each application for each client the data application data usage must be calculated. Therefore, Application A is located at coordinate (2, 3, 4).

Note that some of the nodes in the elastic map can be fictitious in the sense that the cores are not actual cores that are currently turned on, but are potential cores with certain characteristics and bandwidths. If some advantage is seen, the fictitious nodes can be actualized (powered on) as real nodes. The actualization can be performed in an automatic fashion. For example, if a "benefit threshold" (e.g. benefit in performance) is reached by using a potential configuration of real and fictitious nodes within a threshold financial cost, more actual nodes are brought on-line and others can be brought off-line. This also allows the data center service provider to test "what-if" scenarios in which test or hypothetical nodes are added to the elastic map.

In other words, an embodiment of the present invention considers a set of applications represented by the set of vectors S in a multi-dimensional Euclidean space, where each application's vector represents the different utilization rates among customers of a colocation facility using this application. Thus each dimension of the space represents utilization of an application by a given customer and applications used heavily by a given customer are given a large magnitude in the dimension of this customer in the application's vector representation s. Furthermore, customers utilization of an application is measured not only based on time spent computing customer data, but also communication of data from a customer's computing application to some other customer's computing application. In this way, customers are said to "use" applications if their own application are communicatively coupled in any way to those applications.

The hardware of the colocation facility that host applications are decomposed into a set of host nodes Wj in the same space as S, such that each application s in S is mapped to the closest node Wj represented by the set of classes K. The energy of the system, D, is then the energy of the springs with unit elasticity that connect each application to its host computing node. On the set of computing nodes, an additional structure is defined which describes the topology of the communication network in the colocation facility, including link bandwidth between pairs of nodes (Wi, Wj), and other topological constraints imposed by the switching and data processing capabilities of the facility represented here as tuples of nodes, which approximate bending ribs (Wi, Wj, Wk). The stretching energy of the map ($U_E$) is then a function of how far apart pairs of nodes that have high link bandwidth are mapped in the space and the bending energy ($U_G$) is a function of how well the mapping of W to the space abides by these topological constraints. The total energy of the system is then $U=D+U_E+U_G$.

The problem of assigning applications and their associated data to specific compute nodes of a colocation facility then becomes one of, for a given W, find K; for a given K, minimize U and find the new W; if no change, terminate. Note this method terminates when the compute nodes of a facility are appropriately allocated to customers and the applications they use the most (by virtue of their position in the Euclidean space), and the minimization of U ensures that the mapping of applications to these compute nodes, K, is efficient. Furthermore, the topology of the communication network can be an important constraint in this optimization, forcing customers and their applications that communicate most heavily to collocate onto nodes in the facility that share the highest link bandwidth and multi-hop bandwidth.

A colocation center can plug in collections of test (fictitious) nodes (for example, P1 and/or P2 in FIG. 4 discussed below). These test nodes can actually exist (e.g. they can be in a data center but not currently powered on in the data center) and then they are powered on if sufficiently beneficial. In other words, a colocation center can "plug in" to the elastic map a collection of test nodes and these test nodes can represent nodes that are not currently powered on in the data center. The nodes are automatically powered on and connected if the elastic map methodology determines that doing so is sufficiently beneficial. These fictitious nodes can represent computing cores in racks with different energy use-characteristics (e.g. low power and high power).

Figure 4:
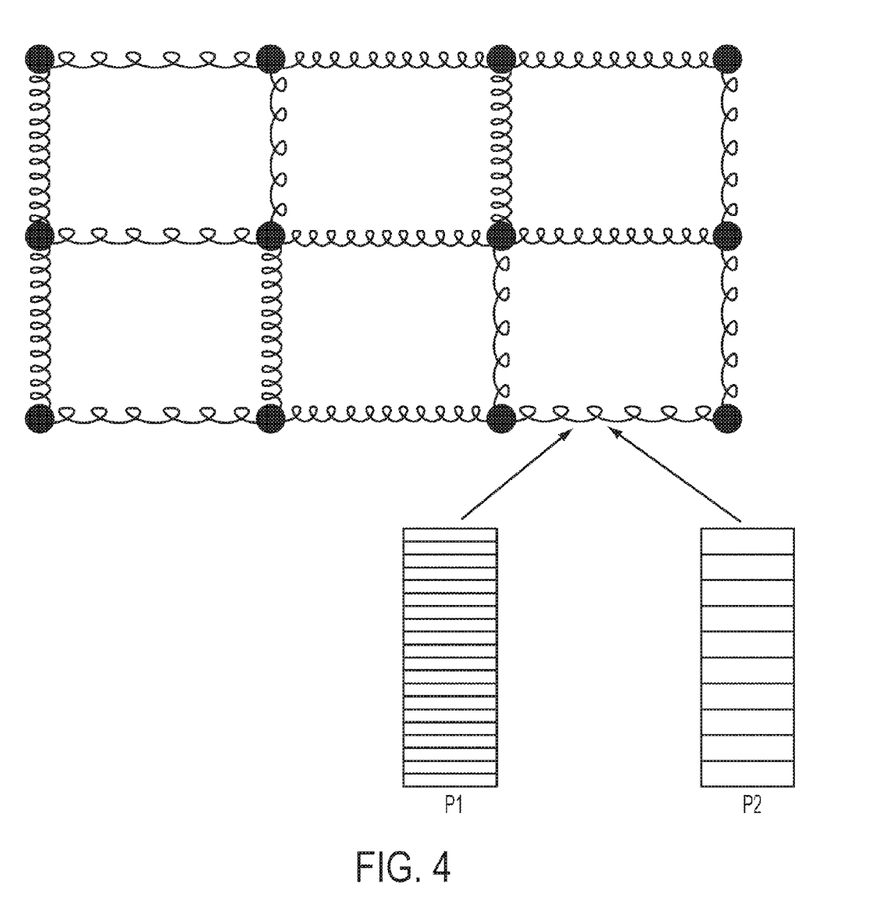
FIG. 4 is an illustration showing inserting/removing fictitious compute nodes according to an embodiment of the present invention.

FIG. 4 is an illustration showing inserting/removing fictitious compute nodes according to an embodiment of the present invention. For example, referring to FIG. 4, P1 can represent 20 nodes in a rack of a data center composed of low-power commodity systems. They can also have an estimated failure rate. They are not currently powered on (e.g. to save energy). P2 can represent 10 nodes in a rack of a data center that are composed of high-end powerful nodes that consume significant energy and are very reliable. P1 and P2 can be "connected" to the elastic map (arrows in diagram). The elastic map energy (EME) is measured from the resultant composite elastic maps after the minimization optimization is performed for each to place applications in their optimal locations among the node. If the EME is sufficiently lower in one configuration than another, a decision module DM is used to automatically determine whether P1 or P2 should be powered on.

Figure 5:
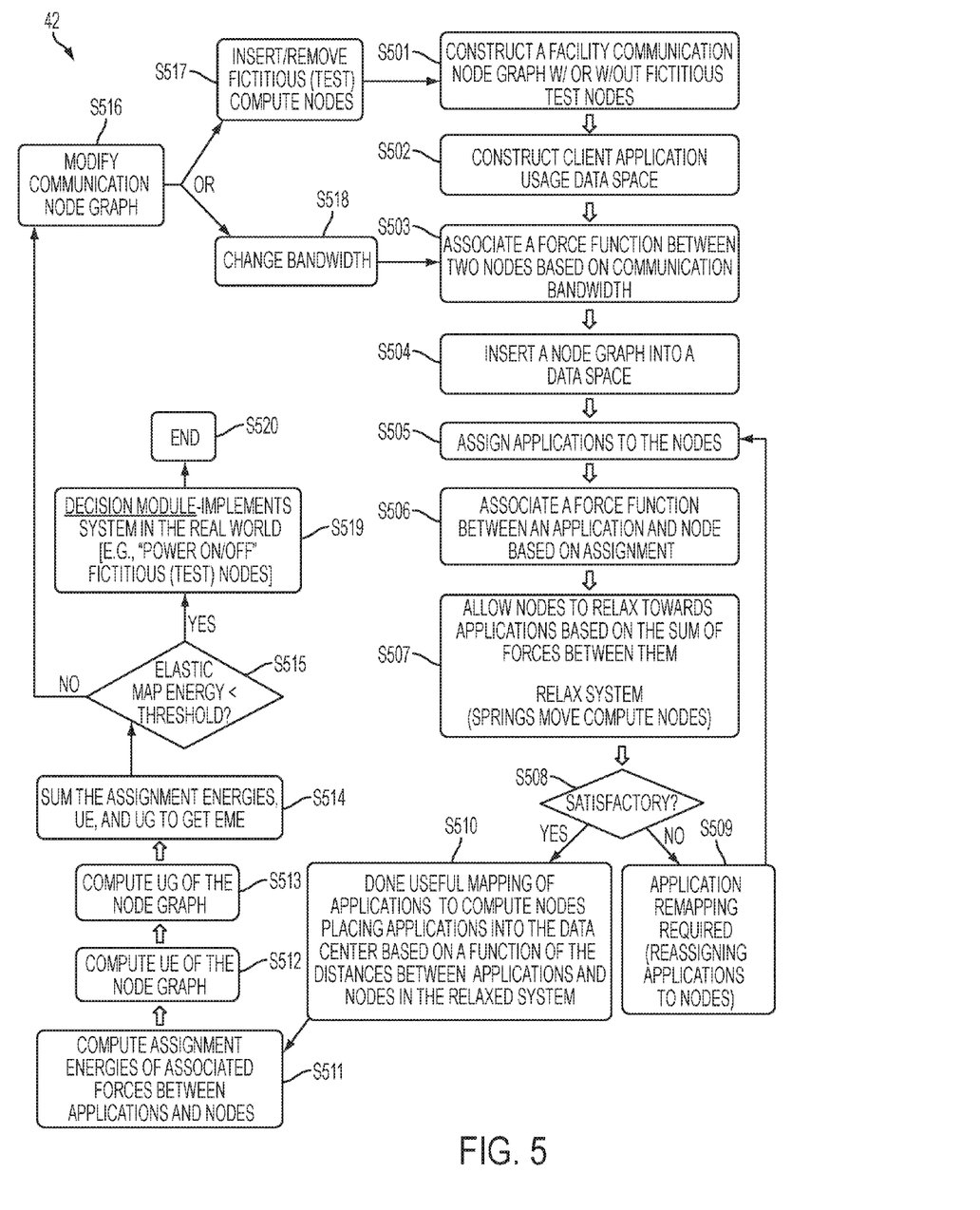
FIG. 5 is a flowchart of the method of steps for placing software applications efficiently into a colocation data center according to an embodiment of the present invention.

FIG. 5 is a flowchart of the method of steps for placing software applications efficiently into a colocation data center according to an embodiment of the present invention. With reference now to FIG. 5, the method includes the following sequence of steps. In Step 501, construct a facility communication node graph with or without fictitious nodes. In Step 502, construct the client application utilization data space. In Step 503, associate a force function of distance (in which the force function is parameterized by a spring constant) between two nodes based on communication bandwidth. Note that distance is computed in the coordinate system of the application data space as a Euclidean distance. The distance between p and q in n dimensions is:

$$d(p, q) = d(q, p) = \sqrt{(q_1 - p_1)^2 + (q_2 - p_2)^2 + \cdots + (q_n - p_n)^2} = \sqrt{\sum_{i=1}^{n} (q_i - p_i)^2}.$$

In Step 504, insert the node graph (elastic map) into the application utilization data space (from Step 502). In Step 505, assign applications to the nodes. In other words, place the applications into the various machines. In Step 506, associate a force function of distance (which is parameterized by another spring constant) between an application and a node based on the assignment (in Step 505). In Step 507, allow the nodes to relax towards the applications based on the sum of forces between them. The applications are considered to remain in place while the spring forces between the nodes and applications cause the nodes to relax toward the applications.

In Step 508, determine whether the system in its relaxed state is satisfactory according to a set threshold, parameter, or set of implicit constraints evaluated by a user of the system. For example, the optimal mapping of applications can require a certain node to have fewer than a fixed threshold of applications ultimately assigned to it for placement. While a user can provide a number of assignment linkages to this node that exceeds this threshold, certain assignment linkages can be removed at this step, if it is found that too many applications are near this node after the system is in its relaxed state. If the system is not satisfactory, then an application remapping is required and the method proceeds to Step 509, in which applications are reassigned linkages to different nodes. Once remapping is complete the system proceeds back to Step 505 and repeats until a satisfactory system is achieved. If the system is determined to be satisfactory in Step 508, the method proceeds to Step 510. In Step 510, applications are placed into the data center based on a function of the distances between applications and nodes in the relaxed system.

In Step 511, compute the assignment energies of the associated forces between applications and nodes. Assignment energies result from the constant residual forces present in springs representing assignment linkages. In Step 512, compute the $U_E$ (stretching energy) of the node graph. In Step 513, compute the $U_G$ (bending energy) of the node graph. In Step 514 sum the assignment energies, the $U_E$, and the $U_G$ in order to determine the elastic map energy (EME). In Step 515, determine whether the EME is less than a set threshold. For example, a user of the system may have learned that an EME of 2.5 represents bandwidth saturation levels (given a proposed placement of applications and their associate data into the collocation center) that will make the center unable to satisfy certain customer service level agreements. If the EME is more than the set threshold then the method proceeds to step 516. In Step 516, the communication node graph is modified in some way according to either Step 517 or Step 518. In Step 517, fictitious compute nodes are removed or inserted. Then the method proceeds back to Step 501 repeating the steps of the method of the present invention. Therefore, after Step 517 is completed, the method proceeds back to Step 501. In Step 518, the bandwidth of the system is changed. For example, the switches and or cables between compute nodes can be changed or the service level agreement with the internet service provider can be changed, etc. From Step 518 the method proceeds back to Step 503.

If the EME is determined to be less than the set threshold in Step 515, then the method proceeds to step 519. In Step 519 a decision module implements the system in the real world. For example, the decision module powers on/off the fictitious nodes and actualizes the system. Once the system is implemented the method proceeds to Step 520, in which it is done.

The method can be implemented automatically so that the data system is always in an optimum configuration. Also, management can test "what if" scenarios without physically altering the system until an optimum configuration is determined.

In another embodiment of the present invention, the virtual springs that join the nodes and an attribute of the nodes themselves can represent characteristics other than bandwidth. For example, these characteristics can relate to the cost of providing electrical power to enable the communication and bandwidth and the cost of providing electrical power to the nodes themselves. In this embodiment, fictitious nodes with lower electrical power costs for a given future timeframe can be actualized as real nodes if a threshold financial cost for electrical cost can be reached.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for placing applications and their associated data into a data center, wherein the computer comprises a processor communicatively coupled to a memory, the method comprising:
    (a) constructing, by the processor, a facility communication node graph to construct an elastic map;
    (b) constructing, by the processor, a client application usage data space;
    (c) associating a force function between two nodes based on communication bandwidth, wherein at least one of the nodes is a fictitious node;
    (d) inserting a node graph into the data space;
    (e) assigning the applications to the nodes;
    (f) associating a force function between each application and each node based on assignment;
    (g) allowing the nodes to relax towards the applications based on the sum of forces between them creating a relaxed system;
    (h) determining whether the relaxed system is satisfactory; and
    (i) placing the applications into the data center based on a function of distances between the applications and the nodes in the relaxed system,
    wherein if the relaxed system is not satisfactory, further comprising:
    (j) reassigning the applications to different nodes; and repeating steps (f) through (i).

* * * * *